United States Patent
Tsukamoto et al.

(10) Patent No.: US 8,288,710 B2
(45) Date of Patent: Oct. 16, 2012

(54) SOLID-STATE IMAGE SENSING DEVICE CAPABLE OF PREVENTING DUST FROM ATTACHING TO OPTICAL PATH, METHOD FOR MANUFACTURING SAME, AND ELECTRONIC DEVICE

(75) Inventors: Hiroaki Tsukamoto, Yamototakada (JP); Kazuo Kinoshita, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 374 days.

(21) Appl. No.: 12/311,228

(22) PCT Filed: Aug. 8, 2007

(86) PCT No.: PCT/JP2007/065494
§ 371 (c)(1),
(2), (4) Date: Apr. 28, 2009

(87) PCT Pub. No.: WO2008/038464
PCT Pub. Date: Apr. 3, 2008

(65) Prior Publication Data
US 2010/0019134 A1    Jan. 28, 2010

(30) Foreign Application Priority Data
Sep. 26, 2006 (JP) ................. 2006-261559

(51) Int. Cl.
*H01J 40/14* (2006.01)
(52) U.S. Cl. ....................................... 250/239
(58) Field of Classification Search .............. 250/239, 250/216
See application file for complete search history.

(56) References Cited

U.S. PATENT DOCUMENTS

| | | | | |
|---|---|---|---|---|
| 4,336,979 A | * | 6/1982 | Hamatani | 359/826 |
| 2002/0034022 A1 | | 3/2002 | Nakamura | |
| 2005/0248684 A1 | * | 11/2005 | Machida | 348/373 |
| 2006/0086890 A1 | * | 4/2006 | Chao et al. | 250/208.1 |
| 2006/0278820 A1 | * | 12/2006 | Senba et al. | 250/239 |

FOREIGN PATENT DOCUMENTS

| | | | |
|---|---|---|---|
| JP | 61-003453 | | 1/1986 |
| JP | 62-261158 | | 11/1987 |
| JP | 63-009970 | | 1/1988 |
| JP | 2000-069347 | | 3/2000 |
| JP | 2002-062462 | | 2/2002 |
| JP | 2003-037260 | | 2/2003 |
| JP | 2004-048266 | | 2/2004 |
| JP | 2005159711 A | * | 6/2005 |
| JP | 2006-042230 | | 2/2006 |
| JP | 2006-100425 | | 4/2006 |

* cited by examiner

*Primary Examiner* — Thanh Luu
(74) *Attorney, Agent, or Firm* — Edwards Wildman Palmer LLP; George W. Neuner

(57) ABSTRACT

A camera module (1) is an assembly of a lens holder (4) and a wiring board (2). The lens holder (4) holds an optical structure (3) which forms an image of a subject. The wiring board (2) has formed thereon a solid-state image sensing element (21) which converts the image of the subject formed by the optical structure (3) to electrical signals. Grease (7) is applied to the camera module (1) in such a manner that the grease is not present in an optical path in the optical structure (3). The grease (7) catches the dust (D) produced during manufacture and while in use, thereby prevented the dust (D) from causing image defects. A solid-state image sensing device is thus provided which is capable of preventing the dust produced during manufacture and while in use from causing image defects.

9 Claims, 10 Drawing Sheets

SOLID-STATE IMAGE SENSING DEVICE CAPABLE OF PREVENTING DUST FROM ATTACHING TO OPTICAL PATH, METHOD FOR MANUFACTURING SAME, AND ELECTRONIC DEVICE

TECHNICAL FIELD

The present invention relates to solid-state image sensing devices capable of preventing dust from attaching to an optical path during manufacture and while in use and relates also to methods and apparatus for manufacturing such a device and electronics incorporating the device.

BACKGROUND ART

An image sensing camera module (solid-state image sensing device) mounted, for example, to mobile phones integrally contains a solid-state image sensing element, an infrared filter, a wiring board with terminals, a lens, and a lens holder. The solid-state image sensing element may be a CCD (charge-coupled device) or a CMOS (complementary metal-oxide semiconductor) sensor IC (integrated circuit). Manufacturing processes have been progressively adapted for reducing the size of the solid-state image sensing element in step with the reduction in size of the camera module. In the increasingly more compact camera modules, fine dust (for example, 25 µm or larger) on an optical path can cause a defect in an image. The defect is a projection of the shadow of the dust appearing as dark spots or a stain on the image. The optical path in the camera module includes, for example, the light-receiving section (light-receiving plane) of the solid-state image sensing element and above a lid glass.

The dust which may cause image defects can be already attaching to a component of the camera module when the component is delivered to a module manufacturer, or may be produced during the manufacture of the module. Most of the dust that is attaching to components at the time of delivery is fine pieces of resin. Meanwhile, most of the dust that is produced during manufacture is metal and produced as a result of abrasion of manufacturing equipment (assembly devices) for the camera module.

The dust having this kind of origin and attaching to the optical path can be removed in an inspection immediately before shipment which is part of the manufacturing process of the camera module. However, the dust that is temporarily staying on any part other than the optical path is undetectable in the inspection immediately before shipment, and the camera module is shipped out as a good product. If the camera module is subjected to vibration or impact during transport after the shipment, the dust temporarily staying can move and attach to the optical path, which would lead to a defect in image at a destination (i.e. a wholesaler who, for example, sells mobile phones with a built-in camera).

One of conventional approaches to these kinds of image defects is to screening out the dust attaching to camera module components at the time of the delivery of the components. Depending on how firmly the dust is attaching, the dust may be blown off by air or washed off in water using ultrasonic waves or in HFE (hydrofluoroether).

Attempts are also being made to raise the cleanliness level of manufacturing lines to prevent dust produced during manufacture from attaching to camera module components. An example is manufacturing in a clean room which is shielded from outside.

However, a clean room would require investment in infrastructure and maintenance (cleaning of equipment and replacement of worn-out components). Large expenses should be expected to cover the installation and maintenance of the clean room and air circulation facilities (air curtains, air circulators, filtering and washing facilities, etc.). Furthermore, even if dust is successfully prevented from going inside the camera module during the assembly of the module in the clean room as above, there are nowadays possibilities of dust being produced inside the camera module while in use. Merely ensuring the cleanliness level during manufacture is insufficient to eliminate dust.

Patent Literatures 1 to 4 disclose solid-state image sensing devices in which image defect-causing dust is caught up in adhesive material.

FIG. 17 is a cross-sectional view of a solid-state image sensing device disclosed in Patent Literature 1. In this structure, an adhesive material 115 is applied in the space formed by a package 111, a solid-state image sensing element 112, and a sealing window glass 114 (internal wall faces of the package 111). The adhesive material 115 catches dust 113 produced in the space. The solid-state image sensing devices of Patent Literatures 2 and 3 have a similar structure.

FIG. 18 is a cross-sectional view of a solid-state image sensing device disclosed in Patent Literature 4. In this structure, a static charged film 230 is disposed inside a space 220 formed by a concave section 218 of a lens holder 216 and a substrate 202. An adhesive material 234 is further disposed on the charged film 230 so that it is exposed in the space 220. Dust 232 is attracted electrostatically by the charged film 230 and then caught up by the adhesive material 234.

Citation List

Patent Literature 1
Japanese Patent Application Publication, Tokukaisho, No. 62-261158 (Publication Date: Nov. 13, 1987)
Patent Literature 2
Japanese Patent Application Publication, Tokukaisho, No. 61-3453 (Publication Date: Jan. 9, 1986)
Patent Literature 3
Japanese Patent Application Publication, Tokukaisho, No. 63-9970 (Publication Date: Jan. 16, 1988)
Patent Literature 4
Japanese Patent Application Publication, Tokukai, No. 2006-42230 (Publication Date: Feb. 9, 2006)

SUMMARY OF INVENTION

These conventional structures have an inherent problem that none of them is completely free from image defects.

In the structures of Patent Literatures 1 to 4, the adhesive material provided in the same space as the solid-state image sensing element 21 catches dust as explained above. In addition to the adhesive material, the structure of Patent Literature 4 includes a static charged film to attract dust to the adhesive material.

The structures of Patent Literature 1 to 3 however allow dust to attach to the optical path, or more specifically, to the surface of the sealing glass 214 on a line extended from the solid-state image sensing element 112. The dust results in a defective image.

The charged film 230 of Patent Literature 4 attracts dust. The charged film 230 is partially present in the optical path. Dust is attracted to the part of the static charged film 230 disposed in the optical path where no adhesive material 234 is present. No adhesive material 234 is present either on the part of the charged film 230 facing the lens unit 212. The dust thus attaches, in the optical path, to both sides of the part of the charged film 230, as well as to the adhesive material 234. In the structure of Patent Literature 4, dust can still attach in the optical path in this manner, causing a defect in images.

Furthermore, in Patent Literature 4, static electricity does not work to attract, for example, metallic dust and can be a cause for malfunctioning of the solid-state image sensing element 206.

The present invention, conceived in view of the problems, has an objective of providing a solid-state image sensing device capable of preventing image defects from occurring due to dust produced during manufacture and while in use and also providing a method and apparatus for manufacturing the solid-state image sensing device, and an electronic device incorporating the solid-state image sensing device.

A solid-state image sensing device is characterized in that it includes: an optical structure for forming an image of a subject; and a solid-state image sensing element for converting the image of the subject formed by the optical structure to electrical signals, wherein grease is applied in such a manner that the grease is not present in an optical path in the optical structure.

According to the invention, grease is applied in such a manner that the grease is not present in the optical path in the optical structure. The grease can thus catch dust which accidentally enters the device during its manufacture and dust which is produced while the device is being used. The invention hence prevents (or reduces) image defects caused by the dust. Furthermore, by using grease, these effects are expected to last over an extended period of time.

In addition, grease allows for easier viscosity adjustment than conventionally used adhesive sheets. This property leads to other additional effects. For example, the grease is easier to apply to application areas, applicable to small details, and exhibits excellent durability, weatherability, and thermal resistance.

The solid-state image sensing device according to the present invention not only refers to a final product, but also encompasses half-finished structures (parts) in which the grease is applied.

The solid-state image sensing device according to the present invention is preferably such that the grease is applied near the optical structure.

When that is the case, the grease can catch dust produced near the optical structure, thereby preventing (or reducing) image defects caused by the dust.

The solid-state image sensing device according to the present invention is preferably such that it further includes a holding section for holding the optical structure and housing therein the solid-state image sensing element, wherein the grease is applied to at least part of an internal surface of the holding section.

According to the invention, the holding section holds the optical structure and houses therein the solid-state image sensing element. The solid-state image sensing element is thus sealed from outside, which prevents dust from accidentally entering the solid-state image sensing element. Furthermore, the grease is applied to at least part of the internal surface of the holding section. Accordingly, the grease can catch dust produced around the optical structure and the solid-state image sensing element, thereby reducing image defects caused by the dust. The grease can catch dust produced inside the sealing, thereby preventing image defects caused by the dust produced inside the sealing.

The solid-state image sensing device according to the present invention is preferably such that the grease is applied to an area where the optical structure contacts the holding section.

Dust is likely to be produced by friction in the area where the optical structure contacts the holding section. According to the invention, the grease is applied to regions where dust is likely to occur, including the particular contact area. The grease can thus catch the dust produced, thereby preventing (or reducing) image defects caused by the dust.

According to the invention, the grease also acts as a lubricant for the contact area, thereby reducing the dust produced by friction and enabling smooth movement of the optical structure.

The solid-state image sensing device according to the present invention is preferably such that the optical structure includes: a lens section containing an image sensing lens and a lens barrel holding the lens section, wherein the grease is applied to an area where the lens section contacts the lens barrel.

Dust is likely to be produced by friction in the area where the lens barrel contacts the lens section. According to the invention, the grease is applied to regions where dust is likely to occur, including the particular contact area. The grease can thus catch the dust produced, thereby preventing (or reducing) image defects caused by the dust.

According to the invention, the grease also acts as a lubricant for the contact area, thereby reducing the dust produced by friction and enabling smooth movement of the lens section.

The solid-state image sensing device according to the present invention is preferably such that it further includes a transparent lid section held between the optical structure and the solid-state image sensing element by the holding section, wherein: the transparent lid section partitions a space in which the optical structure and the solid-state image sensing element are present; and the grease is applied to at least part of the internal surface of the holding section on a side of the optical structure.

According to the invention, the transparent lid section partitions the space in which the optical structure and the solid-state image sensing element are present. The grease is applied the part of the internal surface of the holding section on the same side as the optical structure where dust is likely to occur while the solid-state image sensing device is being used. The grease can catch the dust produced near the optical structure, thereby preventing (or reducing) image defects caused by the dust.

The solid-state image sensing device according to the present invention is preferably such that the solid-state image sensing element is mounted to a substrate; and the grease is applied to a top face of the substrate on which the solid-state image sensing element is mounted.

According to the invention, the grease is applied to the same face as the top face of the substrate on which the solid-state image sensing element is mounted. That is, the grease is applied near the solid-state image sensing element. The grease can thus catch the dust produced around the solid-state image sensing element, thereby preventing (or reducing) image defects caused by the dust.

The solid-state image sensing device according to the present invention is preferably such that the holding section has an embankment formed to prevent the grease from flowing into the optical path.

According to the invention, the grease is prevented from flowing into the optical path because the holding section is provided with the embankment. The grease does not contaminate the optical path. Image defects are thus prevented.

The solid-state image sensing device according to the present invention is preferably such that the grease is composed primarily of poly-α-olefin oil.

The grease composed primarily of poly-α-olefin oil exhibits superior thermal resistance, moisture resistance, and weatherability and hardly degrades. Therefore, if the grease composed primarily of poly-α-olefin oil is applied, the dust can be caught efficiently.

Another solid-state image sensing device according to the present invention is, to address the problems, characterized in that it includes: an optical structure for forming an image of a subject; and a solid-state image sensing element for converting the image of the subject formed by the optical structure to electrical signals, said device further including: a holding section for holding the optical structure and housing therein the solid-state image sensing element; and a transparent lid section held between the optical structure and the solid-state image sensing element by the holding section, wherein: the transparent lid section partitions a space in which the optical structure and the solid-state image sensing element are present; and an adhesive material is applied near the optical structure in such a manner that the adhesive material is not present in an optical path in the optical structure.

According to the invention, the adhesive material is applied near the optical structure in such a manner that the adhesive material is not present in the optical path in the optical structure. The adhesive material can thus catch the dust produced near the optical structure, thereby preventing (or reducing) image defects caused by the dust. By applying the adhesive material near the optical structure, rather than near the solid-state image sensing element, in this manner, dust can be reliably caught at the source of the dust.

The adhesive material may be, for example, a thermosetting resin, a photocuring resin, or an adhesive tape, as well as grease.

A method of manufacturing a solid-state image sensing device according to the present invention is, to address the problems, characterized in that it is a method of manufacturing a solid-state image sensing device including: an optical structure for forming an image of a subject; and a solid-state image sensing element for converting the image of the subject formed by the optical structure to electrical signals, the method including the application step of applying grease in such a manner that the grease is not present in an optical path in the optical structure.

According to the invention, grease is applied in the application step in such a manner that the grease is not present in an optical path in the optical structure. The grease can thus catch dust which accidentally enters the device during its manufacture and dust which is produced while the device is being used. The solid-state image sensing device manufactured prevents (or reduces) image defects caused by the dust by catching it in the grease.

The method of manufacturing a solid-state image sensing device according to the present invention is preferably such that in the application step, the grease is applied by a stamping or dispenser method. When that is the case, the grease can be applied easily and conveniently.

The method of manufacturing a solid-state image sensing device according to the present invention may be such that in the application step, the grease is applied to points. When that is the case, the grease can be applied by exploiting the fluidity of the grease.

The method of manufacturing a solid-state image sensing device according to the present invention is preferably such that after the application step, the solid-state image sensing device is subjected to impact. When that is the case, the grease can catch in advance dust which accidentally enters the solid-state image sensing device during its manufacture. The cleanliness level of the solid-state image sensing device is therefore increased. Image defects are prevented which can be caused by the dust which accidentally enters the device during its manufacture.

The method of manufacturing a solid-state image sensing device according to the present invention is preferably such that in the application step, the grease coats dust attaching to the solid-state image sensing device. When that is the case, the grease coats dust which accidentally enters the device during its manufacture. Thus, the dust can no longer fall off after the manufacture even if the solid-state image sensing device is subjected to vibration or impact. That prevents dust which accidentally enters the device during its manufacture from moving and attaching to the optical path.

An apparatus for manufacturing a solid-state image sensing device according to the present invention is, to address the problems, characterized in that it is an apparatus for manufacturing a solid-state image sensing device including: an optical structure for forming an image of a subject; and a solid-state image sensing element for converting the image of the subject formed by the optical structure to electrical signals, the apparatus including an application tool for applying grease in such a manner that the grease is not present in an optical path in the optical structure.

According to the invention, the application tool applies grease in such a manner that the grease is not present in an optical path in the optical structure. The grease can thus catch dust which accidentally enters the device during its manufacture and dust which is produced while the device is being used. The solid-state image sensing device manufactured prevents (or reduces) image defects caused by the dust by catching it in the grease.

The apparatus for manufacturing a solid-state image sensing device according to the present invention is preferably such that the application tool applies the grease by stamping. When that is the case, the grease can be applied easily and conveniently by transfer.

The apparatus for manufacturing a solid-state image sensing device according to the present invention is preferably such that the application tool has a head of an identical shape to that of a grease application area of the solid-state image sensing device. When that is the case, the head of the application tool makes a surface-to-surface contact with the grease application area of the solid-state image sensing device. Therefore, the grease 7 can be applied uniformly by transfer.

The apparatus for manufacturing a solid-state image sensing device according to the present invention may be such that the application tool has formed on a head thereof acicular projections from which the grease is applied.

According to the invention, the grease is applied from the acicular projections. The grease is therefore applicable to points. Accordingly, the grease can be applied by exploiting the fluidity of the grease.

The apparatus for manufacturing a solid-state image sensing device according to the present invention is preferably such that the application tool applies the grease by a dispenser method. When that is the case, the grease can be applied easily and conveniently by ejecting the grease.

The apparatus for manufacturing a solid-state image sensing device according to the present invention is preferably such that the application tool applies the grease while the application tool is moving relative to the solid-state image sensing device. When that is the case, the grease can be applied more easily and conveniently by a dispenser method.

The apparatus for manufacturing a solid-state image sensing device according to the present invention is preferably such that the application tool applies the grease to points. When that is the case, the grease can be applied by exploiting the fluidity of the grease.

The apparatus for manufacturing a solid-state image sensing device according to the present invention is preferably such that the application tool applies the grease simultaneously to a plurality of solid-state image sensing devices. When that is the case, the invention increases productivity for the solid-state image sensing device.

An electronic device according to the present invention includes any one of the foregoing solid-state image sensing devices. The resultant electronic device reduces image defects because it includes a solid-state image sensing device.

Additional objectives, advantages and novel features of the invention will be set forth in part in the description which follows, and in part will become apparent to those skilled in the art upon examination of the following or may be learned by practice of the invention.

Reference Sings List 1, 1a Camera Module (Solid-state Image Sensing Device)
2 Wiring Board
3 Optical Structure
4 Lens Holder (Holding Section)
5 Lever
6 Transparent Lid Section
7 Grease
7a, 7b Grease Application Area
31 Lens
32 Lens Section
33 Lens Barrel
33a Drive Section
33b Movable Section
34 Tension Ring
70a, 70b, 70c Stamp (Application Tool)
71 Acicular Projections
80 Dispenser (Application Tool)
A Space
B Space
D Dust
F Friction Region (Contact Area)

DESCRIPTION OF EMBODIMENTS

An embodiment of the present invention will be described in reference to FIGS. 1 to 16.

1. Solid-State Image Sensing Device According to Present Invention

The solid-state image sensing device according to the present invention is characterized in that image defects are reduced by collecting dust in grease.

The solid-state image sensing device according to the present invention is suitable for use in electronic devices with image sensing function, including mobile camera phones, digital still cameras, and security cameras. The present embodiment will describe a camera module (solid-state image sensing device) incorporated in a mobile camera phone.

Figure 6:
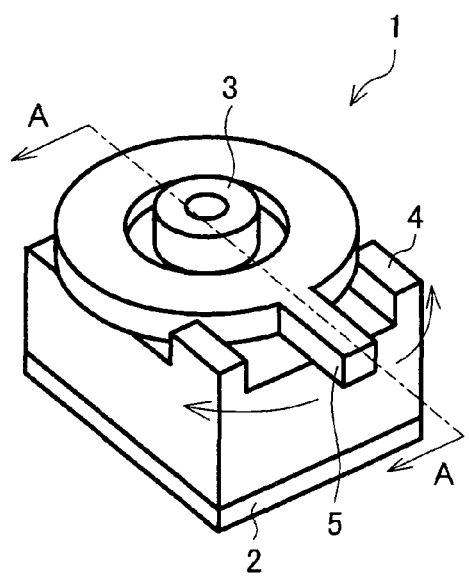
FIG. 6
An oblique view of a camera module of the present invention.

FIG. 6 is an oblique view of the camera module of the present embodiment, illustrating its appearance. The camera module 1 integrally contains a wiring board 2, an optical structure 3, a lens holder 4, and a lever 5 as illustrated in FIG. 6. The lens holder 4, in which the image sensing optical structure 3 is accommodated, is formed on the wiring board 2. The lever 5 is provided on the lens holder 4 to enable shooting mode switching. The lever 5 has, at its center, an opening in which the optical structure 3 is visible. For convenience in description, the side of the module on which the optical structure 3 is visible will be referred to as the front, and the side on which the wiring board 2 is provided as the bottom or back, throughout the following.

Figure 1:
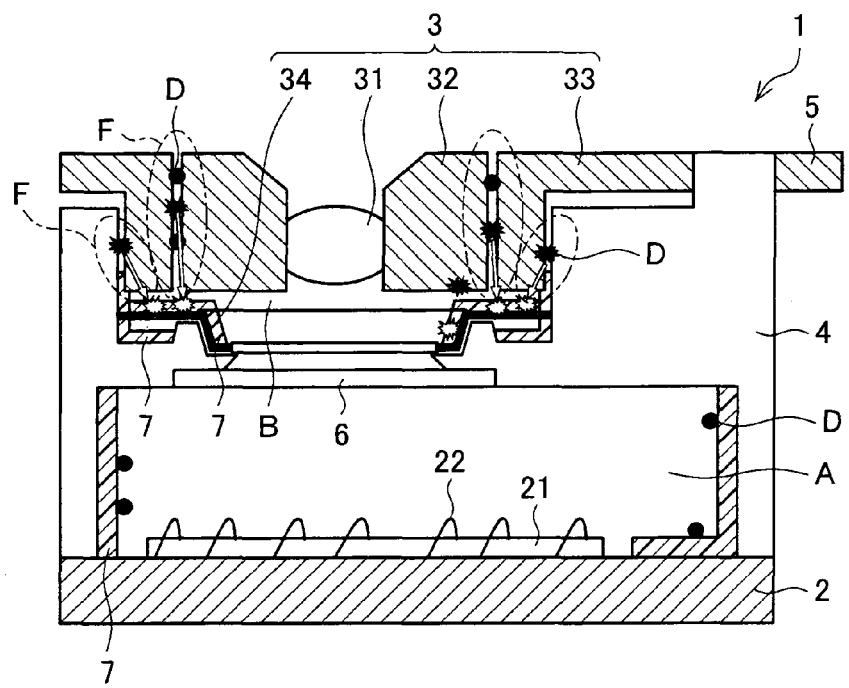
FIG. 1
A cross-sectional view of a camera module of the present invention.

The structure of various parts of the camera module 1 will be now described in detail in reference to FIG. 1 which is a cross-sectional view of the camera module 1 shown in FIG. 6 taken along line A-A.

The wiring board 2 is a substrate with patterned wiring (not shown). A solid-state image sensing element 21 sits at the center of the wiring board 2. The wiring board 2 is electrically connected to the solid-state image sensing element 21 through bonding wires 22 so as to transfer electrical signals back and forth.

The solid-state image sensing element 21 converts an image of a subject formed by the optical structure 3 to electrical signals. In other words, the element 21 is a sensor device performing the photoelectric conversion of incident light coming from the optical structure 3. The solid-state image sensing element 21 has, on its front surface (top surface), a light-receiving plane (not shown) formed by a matrix of pixels. The light-receiving plane converts the optical image formed thereon to electrical signals for output in the form of analog image signals. The solid-state image sensing element 21 is, for example, a CCD or a CMOS sensor IC.

Other electronics mounted on the wiring board 2 include a DSP (digital signal processor) which adjusts an optical axis, a CPU which performs various computations according to programs, ROM which stores the programs, and RAM which stores data during processing (none of them shown). These electronics control the entire camera module 1.

The optical structure 3 is an optical imaging system for forming a subject image. In other words, the optical structure 3 guides light from the subject to form an image on the solid-state image sensing element 21. The optical structure 3 is composed of a lens section 32 supporting a lens 31 at the center, a lens barrel 33 supporting the lens section 32, and a tension ring 34 which vertically moves the lens section 32 in response to manipulation of the lever 5. The optical axis of the lens 31 matches the central axis of the lens barrel 33.

Figure 2:
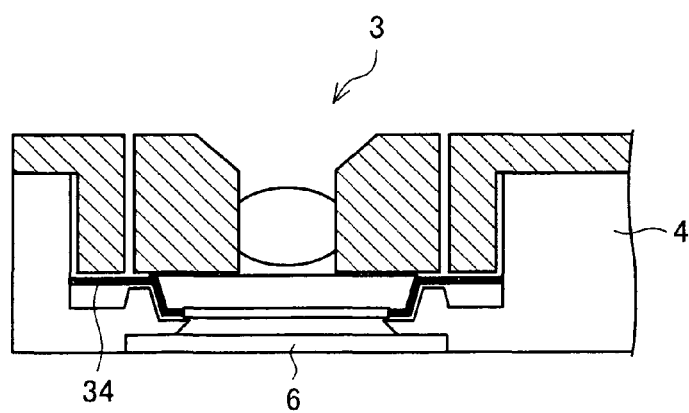
FIG. 2
A cross-sectional view of an optical structure of the camera module in FIG. 1 in normal shooting mode.

The lens section 32 and the lens barrel 33 are both made of resin in the present embodiment. The tension ring 34 restricts excursion of the lens section 32 and the lens barrel 33 when the lens section 32 is housed in the lens barrel 33 as shown in FIGS. 1 and 2. The tension ring 34 also alleviates (reduces) external impact on the lens section 32 and the lens barrel 33. The tension ring 34 is made of, for example, a spring or like elastic object.

The lens holder 4 is a tubular member made of resin. The holder 4 has a space A (sealing section) at the bottom and a space B at the top. The space A seals around (or houses) the solid-state image sensing element 21. The optical structure 3 is supported in the space B. The lens holder 4 holds an optically transparent lid section 6 in the optical path between the optical structure 3 and the solid-state image sensing element 21.

The transparent lid section 6 is made of, for example, glass or a like transparent material. The transparent lid section 6 is provided between the optical structure 3 and the solid-state image sensing element 21 and supported by the lens holder 4. The transparent lid section 6 is designed to cover at least the light-receiving plane of the solid-state image sensing element 21. The transparent lid section 6 separates the optical structure 3 from the solid-state image sensing element 21. More specifically, the interior of the camera module 1 is partitioned by the transparent lid section 6 into the space A defined by the wiring board 2, the lens holder 4 and the transparent lid section 6 and the space B defined by the optical structure 3, the lens holder 4, and the transparent lid section 6. The construction seals the space A containing the solid-state image sensing element 21. No grease 7 is applied in the space A and the space B. The grease 7 provides a sticky section for catching the dust produced during the manufacture or use of the camera module 1 (or electronic device). The grease 7 will be described later in detail.

The transparent lid section 6 blocks external infrared because it is treated by an IR blocking coating process.

The camera module 1 takes a photograph by the solid-state image sensing element 21 picking up incident light which has transmitted through the lens 31 and the transparent lid section 6.

The camera module 1 of the present embodiment has a macro function so that it can switch between normal shooting mode and closeup mode. The mode switching is performed by moving up/down the lens section 32 which in turn is manipulable through the lever 5. The lever 5 is designed to jut out of the mobile camera phone so that the user can manipulate the lever 5. For example, by moving the lever 5 to the left, the focal distance is adjusted for the normal shooting mode; it is adjusted for the closeup mode by moving the lever 5 to the right.

Figure 3:
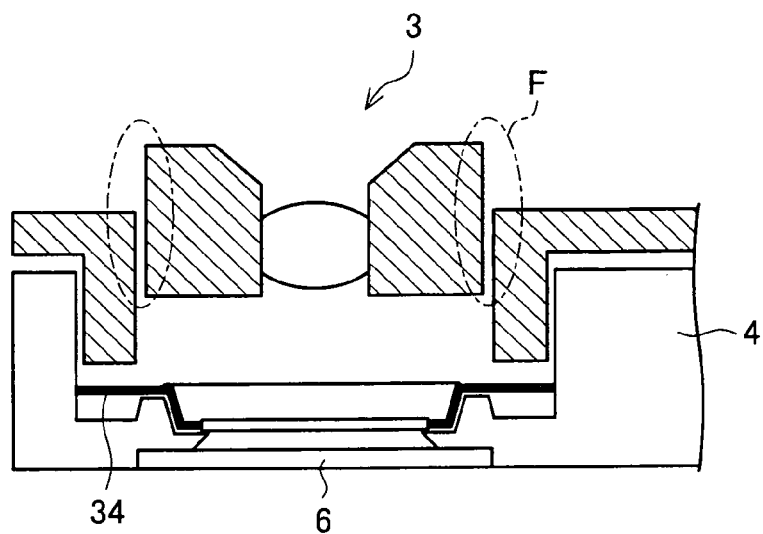
FIG. 3
A cross-sectional view of the optical structure of the camera module in FIG. 1 in transition between normal shooting mode and closeup mode.
Figure 4:
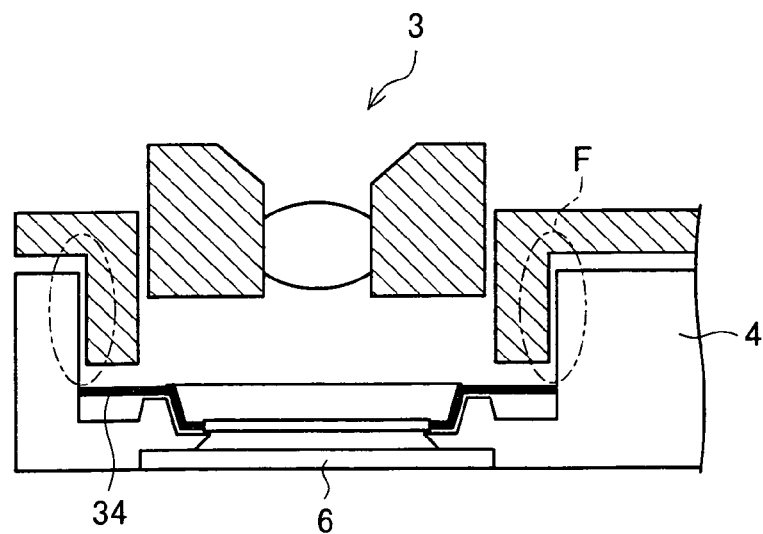
FIG. 4
A cross-sectional view of the optical structure of the camera module in FIG. 1 in closeup mode.

FIGS. 2 to 4 are cross-sectional views of the optical structure 3 in different states, illustrating the macro function of the camera module 1. FIG. 2 depicts the normal shooting mode, FIG. 3 a transition between the normal shooting mode and the closeup mode, and FIG. 4 the closeup mode. FIGS. 2 to 4 are not showing the grease 7.

The lens section 32 and the lens barrel 33 are movable. They move, as illustrated in FIGS. 2 to 4, in response to the mode switching in response to manipulation of the lever 5. The lens 31 is hence positioned at the focal distance in each mode. The focal distance is pre-set in each mode so that the lens 31 is in focus in that mode. The focal distance refers to the distance from the image sensing plane of the solid-state image sensing element 21 to the center of the lens 31. The states shown in FIGS. 2 to 4 are repeated in this manner to perform the mode switching.

The lens section 32 rubs against the lens barrel 33 in a friction region F in mode switching, for example, in a transition from the state in FIG. 2 to the state in FIG. 3, as illustrated in FIG. 3. Similarly, in a transition from the state in FIG. 3 to the state in FIG. 4, the lens barrel 33 rubs against the lens holder 4 in a friction region F. Therefore, dust is produced in the friction regions F while the camera module 1 is being used.

In addition to the dust produced in the friction regions F, the camera module 1 also contains dust that has been attaching to the interior of the camera module 1. The latter type of dust enters the camera module 1 during manufacture and passes undetected in the inspection carried out immediately prior to shipment. If the camera module 1 undergoes vibration or impact, the dust moves in the camera module 1.

These two types of dust may be present in the camera module 1: the dust that is produced in the friction regions F during use (dust produced during use) and the dust that has entered the module 1 during manufacture (dust entering the module during manufacture). If the dust, of whichever origin, attaches to the optical path, the dust projects shadow and creates dark spots or a stain on the light receiving plane. In short, the dust attaching to the optical path leads to image defects.

In view of this problem, the grease 7 is applied in the camera module 1 of the present embodiment to prevent the defect-causing dust from attaching to the optical path.

Figure 5:
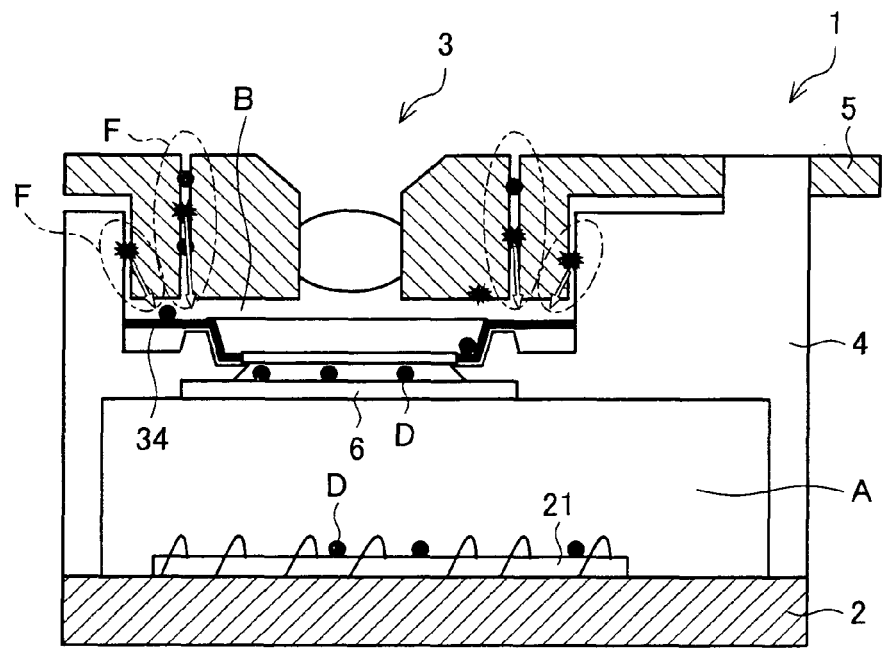
FIG. 5
A cross-sectional view of the camera module in FIG. 1 in which no grease is applied.

Now, the effects of the grease 7, a feature of the present invention, will be described in reference to FIGS. 1 and 5. FIG. 5 is a cross-sectional view of the camera module 1 similar to FIG. 1, but differs in that no grease 7 is applied.

With no grease 7 applied as in FIG. 5, the dust D produced in the friction regions F in mode switching floats in the space B defined by the bottom of the optical structure 3, the lens holder 4, and the transparent lid section 6. The floating dust D may attach to the transparent lid section 6. If the camera module 1 undergoes vibration or experiences impact, the dust D, whether attaching to the internal walls of the lens holder 4 and the tension ring 34 or having entered the space A during manufacture, may attach to the transparent lid section 6 or the solid-state image sensing element 21. In short, when no grease 7 is applied, the dust D can be deposited obstructing the optical path. The dust D casts shadow on the light-receiving plane of the solid-state image sensing element 21, which in turn leads to image defects.

In contrast, with the grease 7 applied as illustrated in FIG. 1, the dust D in the spaces A and B can be caught by the grease 7. The dust is thus prevented from causing image defects.

The grease 7 may be applied to any place, except for the traveling path of the light incident to the optical structure 3, that is, any place provided that the grease 7 does not block the optical path. In the present embodiment, the grease 7 is applied to the internal surface of the lens holder 4 which defines the spaces A and B separated by the transparent lid section 6, but not on the optical path, as illustrated in FIG. 1. More specifically, the grease 7 is applied near the optical structure 3 and around the solid-state image sensing element 21. The grease 7, in the space A, is applied on a face of the wiring board 2 on which is mounted the solid-state image sensing element 21 and also to the internal surface (internal side faces) of the lens holder 4. Meanwhile, in the space B, the grease 7 is applied to a region where the lens holder 4 comes in contact with the optical structure 3 (i.e., one of the friction regions F), a region where the lens barrel 33 comes in contact with the lens section 32 (i.e., the other friction regions F), and a region where the optical structure 3 comes in contact with the tension ring 34. The grease 7 thus applied catches the dust D in the spaces A and B. The dust D is hence prevented from causing image defects. The grease 7 also acts as a lubricant for the friction regions F in the present embodiment. This property of the grease 7 reduces the dust produced by friction and enables smooth movement of the lens section.

In the present embodiment, the camera module 1 has focal point adjusting functionality including the macro function, and the transparent lid section 6 separates the space A from the space B. Under these circumstances, the dust D is produced in the space B, especially, in the friction region F by mode switching. The dust D in the space B does not move into the space A because the space B is separated from the space A by the transparent lid section 6. As a result, there is more dust D in the space B than in the space A. Therefore, in these cases, it is preferred if the grease 7 is applied at least to that part of the internal surface of the lens holder 4 which is present on the same side as the optical structure 3 (in the space B). With the arrangement, the grease 7 efficiently catches the dust D in the space B where more of the dust D is found, preventing the dust D from causing image defects.

The grease 7 is an oily material that is semisolid or almost liquid, and may be made, for example, from a semisolid (or almost solid) or paste lubricant. Specific examples of the grease 7 include molybdenum disulfide-based lubricants, white lubricants, silicone-based lubricants, and perfluoropolyether-based lubricants. Other examples include mineral oil-based greases composed primarily of mineral oil, poly-α-olefin-based greases composed primarily of poly-α-olefin oil, silicone-based greases composed primarily of silicone oil, fluorosilicone-based greases, and perfluoropolyether-based greases composed primarily of perfluoropolyether. These types of grease 7 may be used alone or in combination of two or more of them. Alternatively, the grease 7 may contain additives for use with grease, such as lithium soap, calcium soap, or polytetrafluoroethylene (PTFE). The grease 7 preferably is not runny, so that the grease 7 does not leak into the optical path or the transparent lid section 6. A preferred example of the grease 7 is MOLYKOTE®, EMD-D110, available from Dow Corning Toray Silicone Co., Ltd.

The amount of the grease 7 applied is not limited in any particular manner, provided that the grease 7 can catch the dust D. The amount may be determined according to the properties of the grease 7. Where production of more dust D is expected, the grease 7 should be applied in a relatively large amount.

Figure 7:
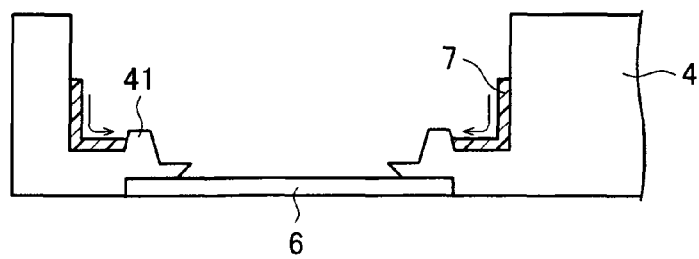
FIG. 7
A cross-sectional view of a lens holder of the camera module in FIG. 1 in which an embankment is provided.

If the grease 7 is applied in excess amount, it can move into the optical path due to its fluidity. To prevent this from happening, the lens holder 4 in the present embodiment is equipped with an embankment 41 as illustrated in FIG. 7. FIG. 7 is a cross-sectional view of the lens holder 4 with the embankment 41. The embankment 41 is disposed along the internal side faces of the lens holder 4. More specifically, the embankment 41 is an upward bulge on the horizontal, grease-applying surface of the lens holder 4. "Upward" refers to the direction from that surface toward the optical structure 3. The embankment 41 stops the grease 7 before the optical path so that it cannot enter the optical path. Accordingly, even if the grease 7 applied to the internal walls of the lens holder 4 flows toward the optical path (in the directions indicated by arrows in FIG. 7), the flowing grease 7 is stemmed by the embankment 41. The construction ensures that if the grease 7 is applied in an increased amount, the grease 7 is prevented from attaching to the transparent lid section 6 and the solid-state image sensing element 21.

As described in the foregoing, the grease 7 is applied in the camera module 1 of the present embodiment. Especially, the grease 7 is applied in the camera module 1 of the present embodiment near the optical structure 3 and around the transparent lid section 6 and the solid-state image sensing element 21. Therefore, the grease 7 catches the dust D which could otherwise cause image defects if it attached to the transparent lid section 6 and the light-receiving plane of the solid-state image sensing element 21. The dust D is thus less likely to cause image defects.

The use of the grease 7 has the following additional effects:

(a) The grease 7 does not only catch the dust D, but coats (fixes) the dust that has been attaching to the application area of the grease 7 since before the application.

(b) The grease 7 spreads easily across the application area due to its fluidity.

(c) The grease 7 hardly degrades in properties (for example, thermal resistance, weatherability, and other physical properties).

(d) The grease 7 is nontoxic.

(e) The properties (for example, viscosity) of the grease 7 can be easily modified by changing the composition.

(f) The grease 7 requires no maintenance work.

2. Method and Apparatus for Manufacturing Solid-State Image Sensing Device According to the Present Invention Next will be described an example of the method and apparatus for manufacturing the camera module 1 of the present embodiment.

Figure 8:
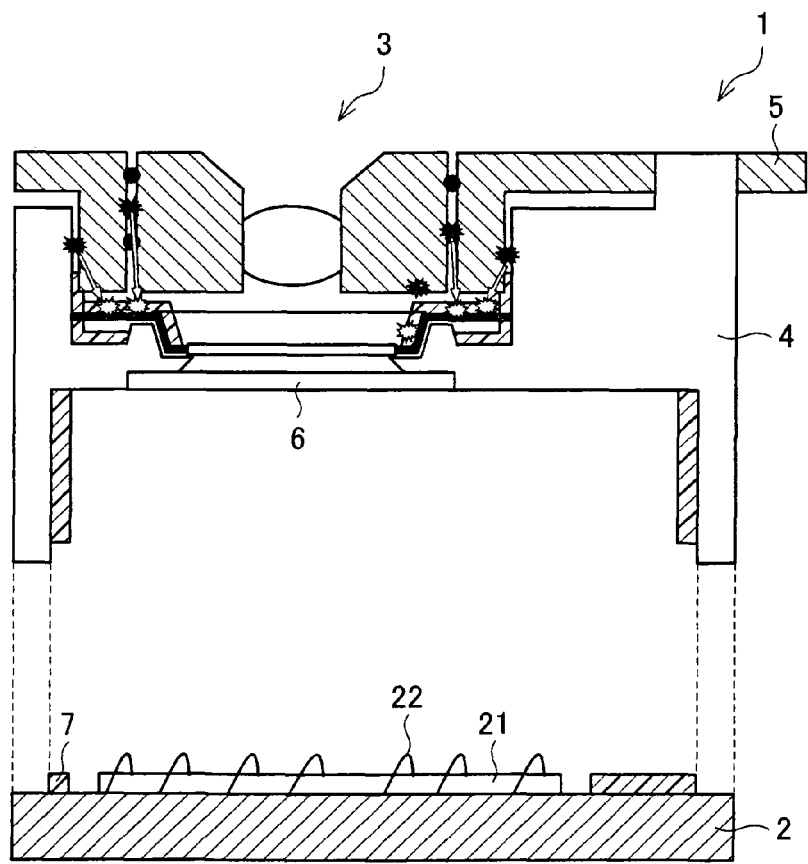
FIG. 8
A cross-sectional view illustrating a manufacturing step of the camera module in FIG. 1.

FIG. 8 is a cross-sectional view of a manufacturing process for the camera module 1. As illustrated in FIG. 8, the camera module 1 may be manufactured by, for example, combining a wiring board 2 carrying thereon a solid-state image sensing element 21 with a lens holder 4 housing an optical structure 3 and a transparent lid section 6, after the wiring board 2 and the holder 4 are manufactured individually.

As described above, the camera module 1 is characterized in that the grease 7 is applied. The camera module 1 is manufactured by a publicly known method (see, for example, Japanese Patent Application Publication, Tokukai, No. 2002-062462) except the application of the grease 7. Description of the conventional processes is omitted, and the following will primarily describe the application (application step) of the grease 7. The grease 7 may be applied before combining the wiring board 2 carrying the solid-state image sensing element 21 with the lens holder 4 housing the optical structure 3 and the transparent lid section 6 into a single module.

The grease 7 may be applied by any method. Examples include stamping and dispenser methods. In stamping, the grease 7 is transferred (like in printing). A dispenser ejects the grease 7 to apply it.

2-1. Stamping

Figure 9:
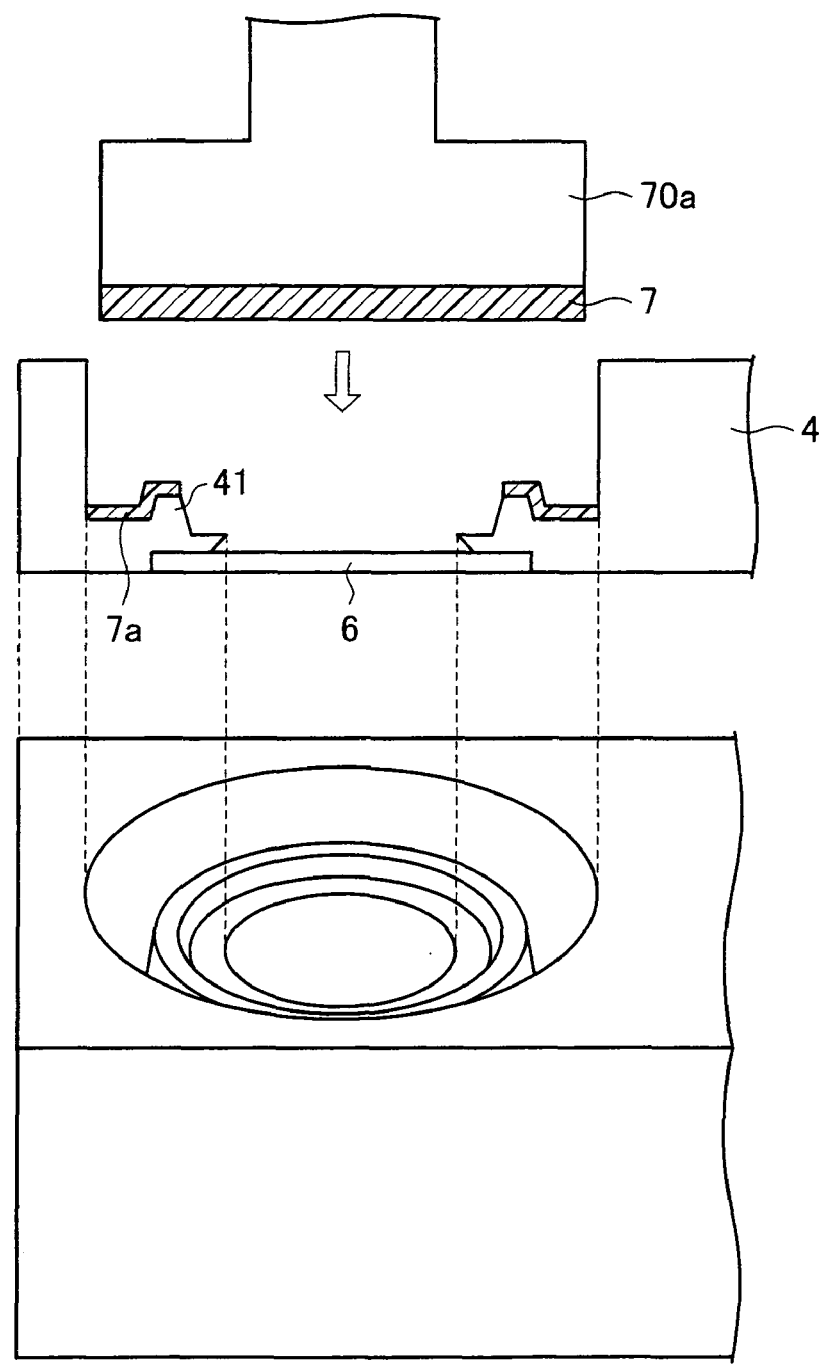
FIG. 9
A cross-sectional view illustrating application of grease with a stamp.
Figure 10:
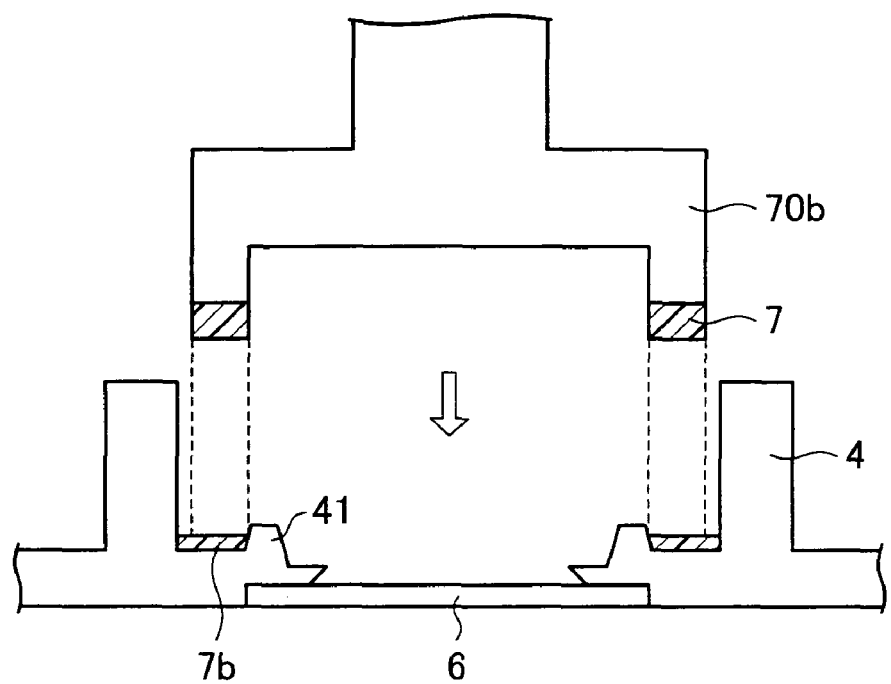
FIG. 10
A cross-sectional view illustrating application of grease with another stamp.

FIGS. 9 and 10 illustrate application of the grease 7 by stamping with stamps (applicators) 70a and 70b. As illustrated in FIGS. 9 and 10, the grease 7 on the head (bottom) of the stamp 70a (or 70b) is transferred to the lens holder 4 so that the grease 7 can be applied to the lens holder 4. The following description assumes that the grease 7 is applied to the lens holder 4 before the optical structure 3 is mounted to the lens holder 4.

The grease 7 is applied to the head of the stamp 70a (or 70b) before the grease 7 is applied to the lens holder 4. The head of the stamp 70a (or 70b) is structured like sponge to absorb the grease 7. The grease 7 may be applied to the head of the stamp 70a (or 70b) by any method. For example, dipping the head of the stamp 70a (or 70b) in a transparent container filled with the grease 7 causes the grease 7 to stay on the head of the stamp 70a (or 70b), and the stamp 70a (or 70b) is ready for the application of the grease 7.

The stamp 70a in FIG. 9 has a flat head. The grease 7 spreads across that plane. As the stamp 70a contacts the lens holder 4, the grease 7 in the contact area is transferred to the lens holder 4 so that the grease 7 is applied to a grease application area 7a of the lens holder 4. The stamp 70a contacts the embankment 41, transferring the grease 7 to the embankment 41. An opening is present at the center of the lens holder 4 as part of an optical path and to hold the transparent lid section 6. However, the grease 7 is not transferred to the transparent lid section 6 because the stamp 70a is pressed to the lens holder 4 in such a way that the head of the stamp 70a does not touch the transparent lid section 6.

The central axis of the stamp 70a is aligned with the optical axis of the optical structure 3 (optical axis of the lens 31) when the stamp 70a is moved to contact the lens holder 4 (when the grease 7 is applied). This method ensures that the grease 7 is applied to the grease application area 7a.

The stamp 70b in FIG. 10 differs from the stamp 70a in FIG. 9 in that the part of the head where no transfer of the grease 7 should occur is removed. In other words, the head of the stamp 70b is of the same shape as the grease application area 7b of the lens holder 4. The head of the stamp 70b is shaped so that it does not touch the embankment 41. The stamp 70b contacts only the grease application area 7b of the lens holder 4. Therefore, the grease 7 is applied selectively to the grease application area 7b. Furthermore, the usage of the grease 7 can be saved better with the stamp 70b than with the stamp 70a.

As detailed above, when either of the stamps 70a and 70b is used, the head of the stamp makes a surface-to-surface contact with the lens holder 4. The process applies the grease 7 uniformly across the lens holder 4 by transfer. The heads of the stamps 70a and 70b are made of sponge. The stamps 70a and 70b are moved in such a way that the heads can touch a stamp pad in which the grease 7 is spread in a uniform thickness and absorb the grease 7.

Figure 11:
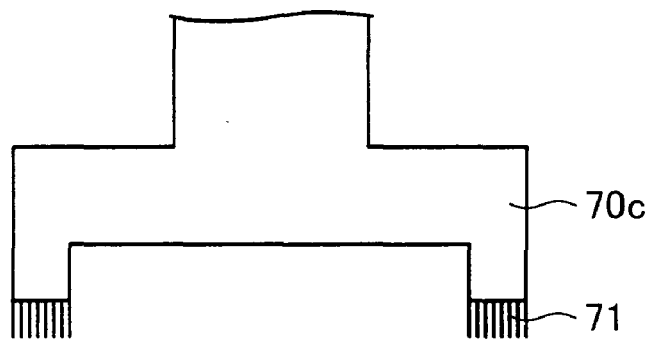
FIG. 11
A cross-sectional view of another stamp.

Alternatively, the head of a stamp 70c may make a point-to-point contact with the lens holder 4 as illustrated in FIG. 11. FIG. 11 is a cross-sectional view of the stamp 70c. The stamp 70c in FIG. 11 differs from the stamp 70b in FIG. 10 in that it has acicular projections 71 formed on the head. The acicular projections 71 may be made of, for example, SUS (stainless used steel) or ultrahigh strength steel. With the stamp 70c, the grease 7 is first applied to the acicular projections 71 and then to the area of application.

The stamp 70c touches only the grease application area 7b (see FIG. 10) of the lens holder 4, similarly to the stamp 70b. Therefore, the stamp 70c applies the grease 7 selectively to the grease application area 7b. Furthermore, the usage of the grease 7 can be saved better with the stamp 70c than with the stamp 70a.

Besides, if the stamp 70c is used, the acicular projections 71 contact the lens holder 4. In other words, the acicular projections 71 of the stamp 70c make a point-to-point contact with the lens holder 4. Accordingly, the grease 7 is applied at points on the lens holder 4. If the grease 7 is applied in large amount, it could flow into the optical path due to its fluidity. However, after applying the grease 7 at points, the grease 7 spreads on the lens holder 4 due to its fluidity. The construction thus enables substantially uniform application of the grease 7, preventing excessive application of the grease 7. The construction also saves the usage of the grease 7. Therefore, when the grease 7 has high fluidity, the grease 7 is applied particularly well if it is applied only at points.

FIGS. 9 to 11 illustrate the application of the grease 7 to the lens holder 4. The grease 7 can be similarly applied to the wiring board 2 and the lens holder 4. The grease 7 can be applied to the internal side faces of the lens holder 4 similarly, but separately.

2-2. Dispenser Method

Figure 12:
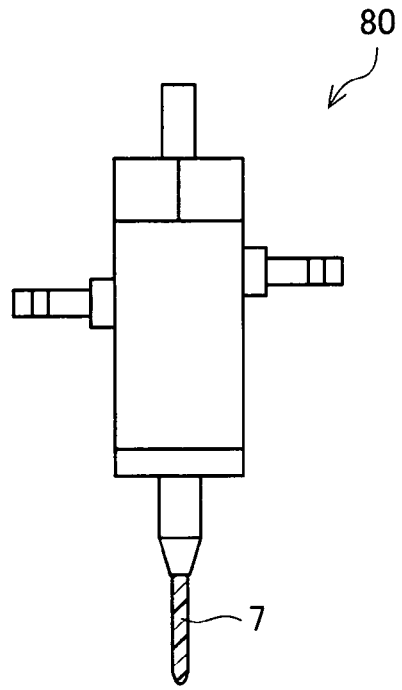
FIG. 12
A schematic illustration of a dispenser used to apply grease by a dispenser method.

Dispenser methods employ a dispenser (applicator) to apply the grease 7 to the lens holder 4. FIG. 12 is a schematic illustration of a dispenser 80 used in the dispenser method to apply the grease 7. The dispenser 80 contains the grease 7 and ejects the grease 7 from its head to apply the grease 7. The dispenser 80 and the lens holder 4 are moved relative to each other when applying the grease 7. The mechanism facilitates the application of the grease 7.

Figure 13:
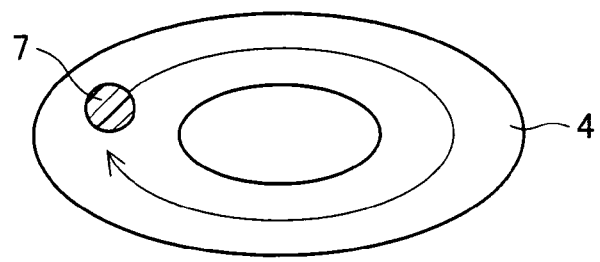
FIG. 13
A drawing illustrating application of grease with the dispenser in FIG. 12.
Figure 14:
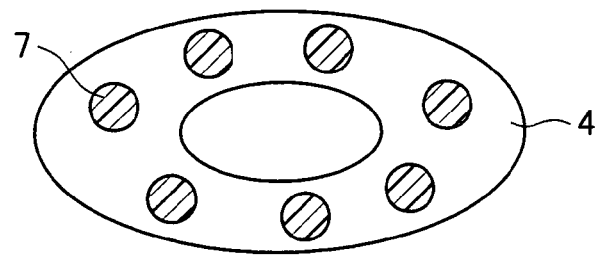
FIG. 14
A drawing illustrating application of grease with the dispenser in FIG. 12.

FIGS. 13 and 14 illustrate the application of the grease 7 with the dispenser 80. The figures show the grease application area of the lens holder 4 as viewed from above similarly to FIG. 9.

Referring to FIG. 13, if the grease 7 is ejected continuously from the dispenser 80, the grease 7 is applied in two dimensions (elongated area). Accordingly, the grease 7 is applied uniformly across the lens holder 4.

Meanwhile, if the grease 7 is ejected from the dispenser 80 intermittently as illustrated in FIG. 14, the grease 7 is applied only to points. The mechanism thus enables substantially uniform application of the grease 7 across the lens holder 4 by virtue of the fluidity of the grease 7, preventing excessive application of the grease 7. The mechanism also saves the usage of the grease 7. If the grease 7 is applied to points in areas where a member contacts another, such as the area where the optical structure 3 contacts the tension ring 34, the grease 7 spreads due to the contact across the contact area, successfully leading to substantially uniform application of the grease 7.

As described in the foregoing, the stamping and dispenser methods of grease application are very simple. The grease 7 can be applied to the wiring board 2, the lens holder 4, and the lens section 32 by a similar stamping or dispenser method. Either method may be selected for the application of the grease 7 depending, for example, on the size and shape of the application area. The stamping method is effective when the application area is large. The dispenser method is effective when the application area is small and the grease 7 needs to be applied to small details.

The grease 7 is preferably applied simultaneously to multiple lens holders 4 by the stamping or dispenser method. For example, with the apparatus shown in FIG. 16, the grease 7 may be applied to multiple (four) lens holders 4 using an assembly of multiple (four) stamps 70a. Specifically, the apparatus in FIG. 16 uses a tray 74 and an applicator. The tray 74 carries an array of multiple lens holders 4 to which the grease 7 will be applied. The applicator contains multiple stamps 70a.

The stamps 70a are fixed to a support plate 72. The stamps 70a are housed inside cylindrical enclosures 73 when grease is not being applied. To apply grease, the lever 75 is pushed down, and as a result, the stamps 70a in the enclosures 73 move out of the enclosures 73 through the bottoms.

Using this apparatus, the grease 7 is applied to the lens holders 4 as follows. First, the lens holders 4 are arranged on the tray 74, and the lever 75 is pushed down with the enclosures 73 aligned with the openings of the lens holders 4. The diameter of the openings of the lens holders 4 is substantially equal to the diameter of the enclosures 73 and smaller than the diameter of the heads of the stamps 70a. Therefore, as the lever 75 is pushed down, the enclosures 73 move into contact with the steps in the lens holders 4 and stop there. The stamps 70a in the enclosures 73, in contrast, move through the openings and reach the lens holders 4, applying the grease 7 on the heads to the lens holders 4.

Applying grease 7 simultaneously to multiple lens holders 4 as above reduces the time taken by the application of the grease 7 and enables simultaneous fabrication of components of the camera module 1. The mechanism increases productivity for the camera module 1.

The grease 7 may be applied in any amount provided that the grease 7 can catch dust and does not flow into the optical path. Suitable amounts of the grease 7 may vary with the properties of the grease 7.

If the grease 7 is applied to where it should not be applied, it can be wiped off immediately using isopropanol (IPA), for example.

The camera module 1 is preferably subjected to impact, for example, in vibration after the application of the grease 7 is complete, for example, after the manufacture of the camera module 1 is complete, so that the grease 7 can before shipment catch the dust which accidentally entered the solid-state image sensing device during manufacture. The vibration process enhances the cleanliness of the camera module 1. Even if the dust which accidentally entered the device during manufacture is attaching to the interior of the camera module 1, the dust falls off under the impact. The fallen dust is caught by the grease 7.

As described in the foregoing, the grease 7 is applied in such a manner that it does not flow into the optical path of the optical structure 3, according to the method and apparatus of manufacturing the camera module 1 of the present embodiment. Therefore, in the camera module 1 manufactured, the grease 7 prevents (or reduces) image defects caused by the dust D by catching the dust D regardless of whether the dust D accidentally entered the module 1 during manufacture or was produced while the camera module 1 is being used. Especially, the grease 7 is applied in the present embodiment near the optical structure 3 and around the transparent lid section 6 and the solid-state image sensing element 21. The grease 7 reduces image defects caused by the dust D on the transparent lid section 6 and the light-receiving plane of the solid-state image sensing element 21 by catching the dust D.

Figure 15:
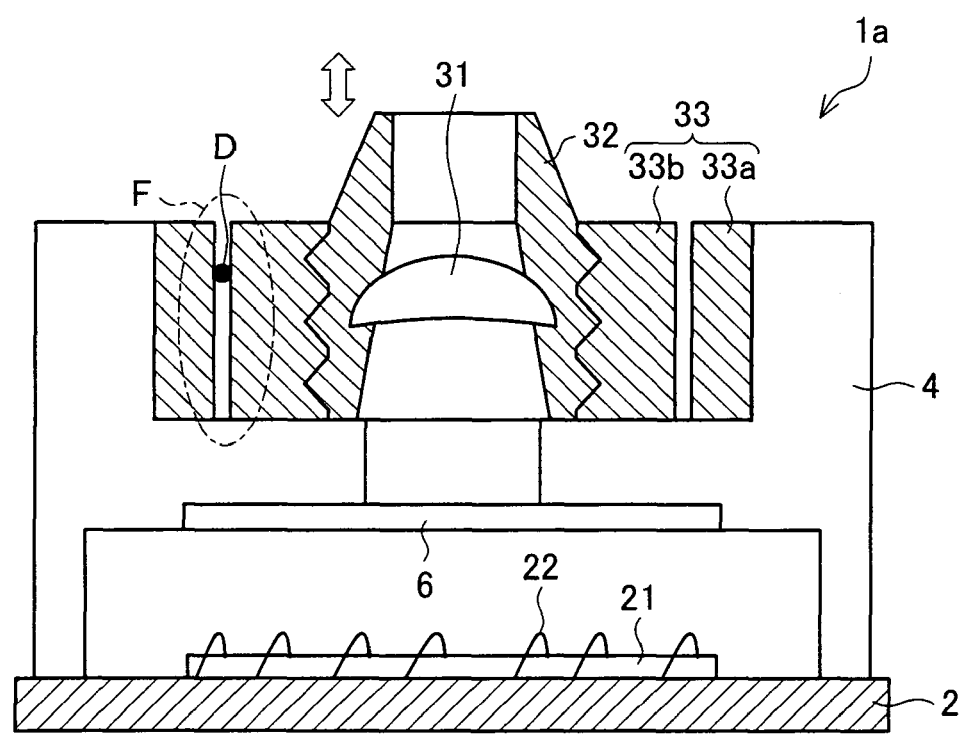
FIG. 15
A cross-sectional view of a camera module with an autofocus and/or zoom function.
Figure 16:
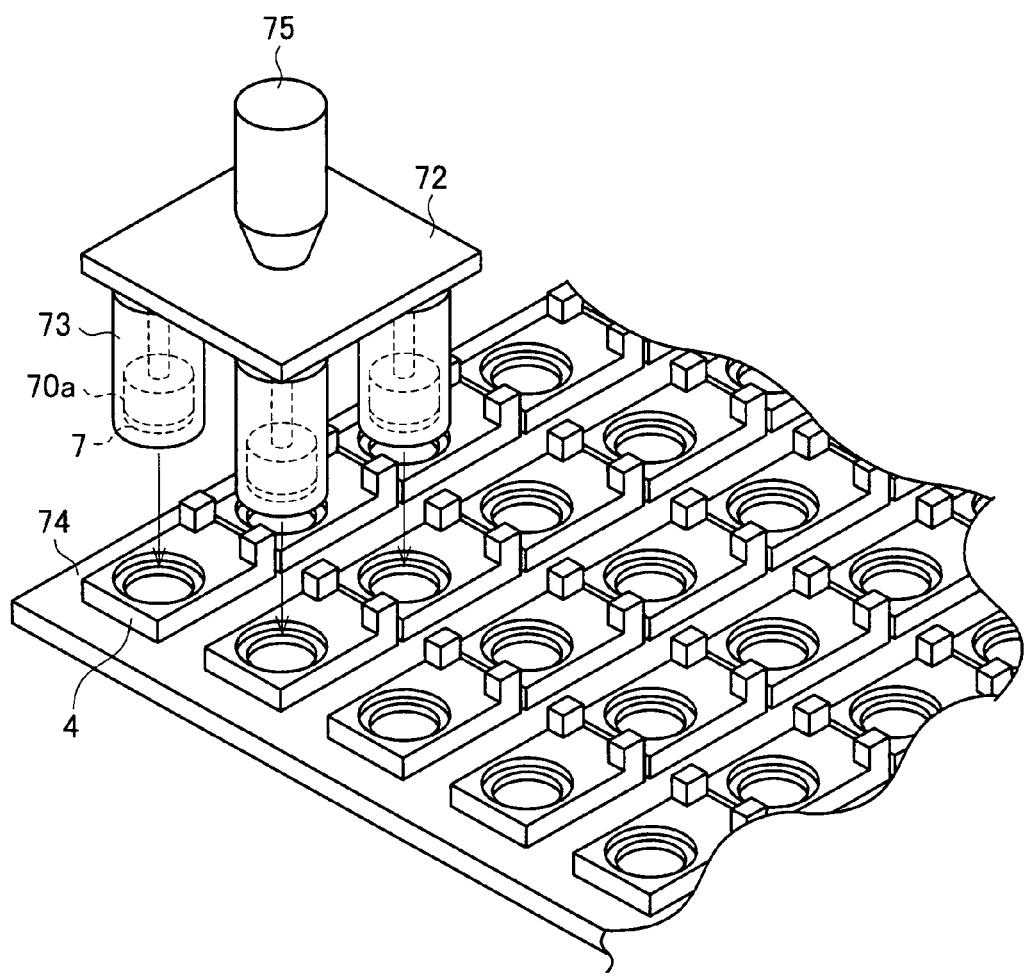
FIG. 16
An oblique view illustrating application of grease to multiple lens holders.
Figure 17:
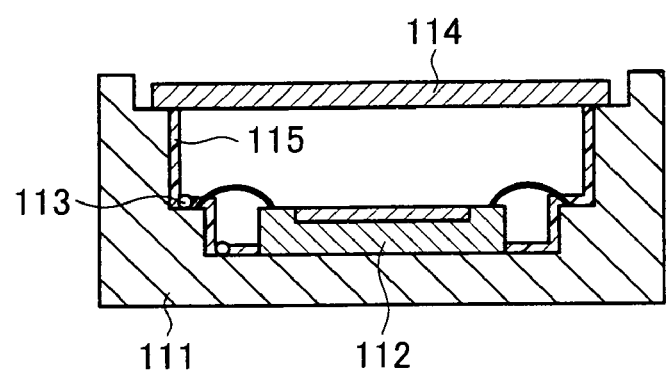
FIG. 17
A cross-sectional view of a solid-state image sensing device described in Patent Literature 1.
Figure 18:
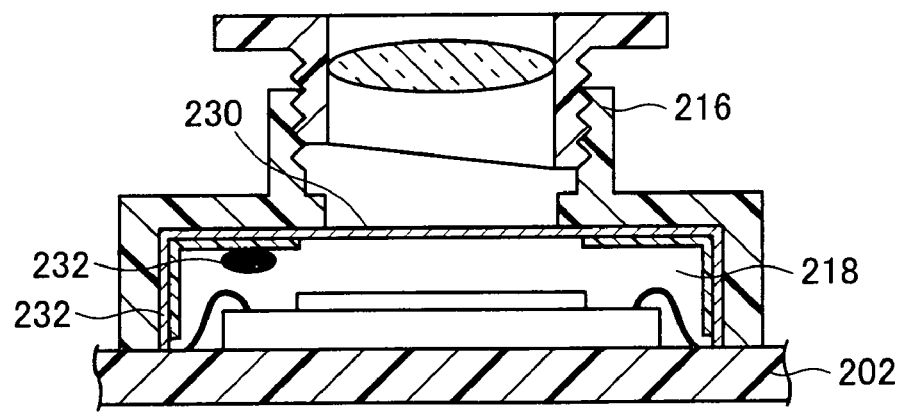
FIG. 18
A cross-sectional view of a solid-state image sensing device described in Patent Literature 4.

The present embodiment has so far described the camera module 1 with a macro function. The invention is applicable also to camera modules with other focal point adjusting functionality, such as an autofocus (AF) and/or zoom function. As an example, FIG. 15 is a cross-sectional view of a camera module 1a with an autofocus and/or zoom function. The camera module 1a has the same structure as the camera module 1 in FIG. 1, except for the optical structure 3. The optical structure 3 in the camera module 1a is composed of a lens section 32 supporting a lens 31 at the center and a lens barrel 33 supporting the lens section 32. The lens barrel 33 of this example is in turn composed of a drive section 33a and a movable section 33b.

The external side face of the lens section 32 and the internal side face of the lens barrel 33 are threaded. The lens section 32 is screwed into the lens barrel 33. The structure enables the lens section 32 to move up/down to a suitable focal distance.

In the camera module 1a, the drive section 33a may be a magnet, and the movable section 33b may be a coil, for example. The focus distance adjustment and zoom functions are achieved by means of magnetic repulsion.

When the drive section 33a into which the lens section 32 is screwed moves, the movable section 33b rubs against the drive section 33a in a friction region F, and dust is likely to be produced. Grease (not shown) is preferably applied to the friction region F (threads) in the camera module 1a. If the grease 7 is to be applied to the friction region F (contact area) between the drive section 33a and the movable section 33b as in the camera module 1a, applying to either one of the sections 33a and 33b would be sufficient; as the movable section 33b moves, the grease 7 spreads. The grease applied to the friction region F between the drive section 33a and the movable section 33b as in this example catches the dust D produced in the friction region F and acts as a lubricant in the friction region F.

The camera module 1a may contain a tension ring 34 (not shown in FIG. 15) similarly to the structure in FIG. 1.

The present invention is not limited to the description of the embodiments above, but may be altered by a skilled person within the scope of the claims. An embodiment based on a proper combination of technical means disclosed in different embodiments is encompassed in the technical scope of the present invention.

The solid-state image sensing device according to the present invention, as described in the foregoing, is adapted so that grease is applied not to block the optical path. The electronic device according to the present invention contains the solid-state image sensing device according to the present invention. Therefore, the electronic device reduces image defects caused by the dust produced during manufacture and while in use, by catching the dust in the grease.

The solid-state image sensing device which reduces image defects is readily manufactured by the method and apparatus of manufacturing the solid-state image sensing device according to the present invention.

The embodiments and examples described in the Description of Embodiments section are for illustrative purposes only and by no means limit the scope of the present invention. Variations are not to be regarded as a departure from the spirit and scope of the invention, and all such modifications as would be obvious to one skilled in the art are intended to be included within the scope of the claims below.

Industrial Applicability

Grease is applied to the interior of the camera module of the present invention. The grease adsorbs dust produced during manufacture and while in use. Therefore, the image sensing device according to the present invention is suitable for use in mobile camera phones, digital still cameras, security cameras, and like devices and adsorbs the dust produced while the devices are being used and out on the road in the grease, to prevent the dust from attaching again to the image sensing device. The invention thus allows for quality improvement and cost reduction by virtue of large yield improvement.

The invention claimed is:

1. A solid-state image sensing device, comprising:
an optical structure for forming an image of a subject;
a solid-state image sensing element for converting the image of the subject formed by the optical structure to electrical signals; and
a holding section for holding the optical structure and housing therein the solid-state image sensing element, wherein
grease is applied in such a manner that the grease is not present in an optical path in the optical structure,
the grease is applied to at least part of an internal surface of the holding section, and
the holding section has an embankment formed to prevent the grease from flowing into the optical path, wherein the embankment is disposed along an internal side face of the lens holder and the embankment comprises a bulge on a grease-applying surface, which is perpendicular to the optical axis of the holding section, and the bulge projects toward the optical structure.

2. The solid-state image sensing device as set forth in claim 1, wherein the grease is applied to an area where the optical structure contacts the holding section.

3. The solid-state image sensing device as set forth in claim 1, wherein the optical structure includes: a lens section containing an image sensing lens and a lens barrel holding the lens section,
wherein
the grease is applied to an area where the lens section contacts the lens barrel.

4. The solid-state image sensing device as set forth in claim 1, further comprising a transparent lid section held between the optical structure and the solid-state image sensing element by the holding section,
wherein:
the transparent lid section partitions a space in which the optical structure and the solid-state image sensing element are present; and
the grease is applied to at least part of the internal surface of the holding section on a side of the optical structure.

5. The solid-state image sensing device as set forth in claim 1, wherein:
the solid-state image sensing element is mounted to a substrate; and
the grease is applied to a top face of the substrate on which the solid-state image sensing element is mounted.

6. The solid-state image sensing device as set forth in claim 1, wherein the grease is composed primarily of poly-α-olefin oil.

7. An electronic device, comprising the solid-state image sensing device as set forth in claim 1.

8. A solid-state image sensing device, comprising:
an optical structure for forming an image of a subject;
a solid-state image sensing element for converting the image of the subject formed by the optical structure to electrical signals;
a holding section for holding the optical structure and housing therein the solid-state image sensing element;
a transparent lid section held between the optical structure and the solid-state image sensing element by the holding section; and
a holding section for holding the optical structure and housing therein the solid-state image sensing element, wherein:
the transparent lid section partitions a space in which the optical structure and the solid-state image sensing element are present,
an adhesive material is applied near the optical structure in such a manner that the adhesive material is not present in an optical path in the optical structure,
the grease is applied to at least part of an internal surface of the holding section, and
the holding section has an embankment formed to prevent the grease from flowing into the optical path, wherein the embankment is disposed along an internal side face of the lens holder and the embankment comprises a bulge on a grease-applying surface, which is perpendicular to the optical axis of the holding section, and the bulge projects toward the optical structure.

9. An electronic device, comprising the sold-state image sensing device as set forth in claim 8.

* * * * *